(12) United States Patent
Haller et al.

(10) Patent No.: US 11,582,542 B2
(45) Date of Patent: Feb. 14, 2023

(54) LOUDSPEAKER WITH A LIGHTING ELEMENT CONTAINED THEREIN

(71) Applicant: Robert Bosch GmbH, Stuttgart (DE)

(72) Inventors: Achim Haller, Weissach Im Tal-Oberweissach (DE); Mathieu Grelaud, Ludwigsburg (DE); Michael Schoenherr, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/053,889

(22) PCT Filed: Jun. 18, 2019

(86) PCT No.: PCT/EP2019/066030
§ 371 (c)(1),
(2) Date: Nov. 9, 2020

(87) PCT Pub. No.: WO2020/035195
PCT Pub. Date: Feb. 20, 2020

(65) Prior Publication Data
US 2021/0297759 A1    Sep. 23, 2021

(30) Foreign Application Priority Data
Aug. 14, 2018    (DE) .................. 102018213662.9

(51) Int. Cl.
*H04R 1/00*    (2006.01)
*H04R 1/02*    (2006.01)
(Continued)

(52) U.S. Cl.
CPC ............... *H04R 1/028* (2013.01); *B60Q 3/20* (2017.02); *F21V 33/0056* (2013.01);
(Continued)

(58) Field of Classification Search
CPC . H04R 1/00; H04R 1/02; H04R 1/023; H04R 1/025; H04R 1/026; H04R 1/028;
(Continued)

(56) References Cited

U.S. PATENT DOCUMENTS 3,927,402 A * 12/1975 Thompson ............... A63J 17/00
                                                        340/815.45
4,817,163 A *  3/1989 Stastny ................... A63J 17/00
                                                        181/148

(Continued)

FOREIGN PATENT DOCUMENTS

DE    102005052767 B3    1/2007
DE    102006050764 A1    4/2008
(Continued)

OTHER PUBLICATIONS

International Search Report for PCT/EP2019/066030, dated Sep. 11, 2019.

*Primary Examiner* — Thang V Tran
(74) *Attorney, Agent, or Firm* — Norton Rose Fulbright US LLP; Gerard Messina

(57) ABSTRACT

A loudspeaker containing a sound-generating element and a grill mounted as a cover in front of the sound-generating element. The grill has optically transparent areas. At least one lighting element is mounted between the sound-generating element and the grill, the lighting element being visible from the outside through the optically transparent areas of the grill when illuminated.

3 Claims, 1 Drawing Sheet

(51) Int. Cl.
   *B60Q 3/20*   (2017.01)
   *F21V 33/00*  (2006.01)
   *F21Y 115/10* (2016.01)

(52) U.S. Cl.
   CPC .......... *H04R 1/023* (2013.01); *F21Y 2115/10* (2016.08); *H04R 2499/13* (2013.01)

(58) Field of Classification Search
   CPC ... H04R 2499/13; B60Q 3/20; F21V 33/0056; F21Y 2115/10
   See application file for complete search history.

(56) References Cited

U.S. PATENT DOCUMENTS

| | | | |
|---|---|---|---|
| 4,875,143 A | * | 10/1989 | Fernandez ............... B60Q 1/26 362/86 |
| 6,000,493 A | * | 12/1999 | Chen ...................... H04R 1/028 181/141 |
| 2011/0255711 A1 | | 10/2011 | Ivey et al. |
| 2015/0201295 A1 | * | 7/2015 | Lau ...................... H04R 29/008 381/59 |

FOREIGN PATENT DOCUMENTS

| | | | | |
|---|---|---|---|---|
| JP | S5885868 U | | 6/1983 | |
| JP | H0359249 U | | 6/1991 | |
| JP | 2003059249 A | | 2/2003 | |
| JP | 3131927 U | * | 5/2007 | ............... H04R 1/00 |
| JP | 2018082352 A | | 5/2018 | |
| KR | 20090061900 A | * | 6/2009 | ............... B60Q 3/20 |
| KR | 20090061900 A | | 6/2009 | |
| KR | 101266027 B1 | * | 5/2013 | .......... F21V 33/0056 |
| WO | WO-2010130676 A1 | * | 11/2010 | .......... F21V 33/0056 |
| WO | WO-2011010187 A1 | * | 1/2011 | ............. H04R 1/023 |
| WO | 2016058652 A1 | | 4/2016 | |
| WO | WO-2016058652 A1 | * | 4/2016 | ............. H04R 1/028 |

* cited by examiner

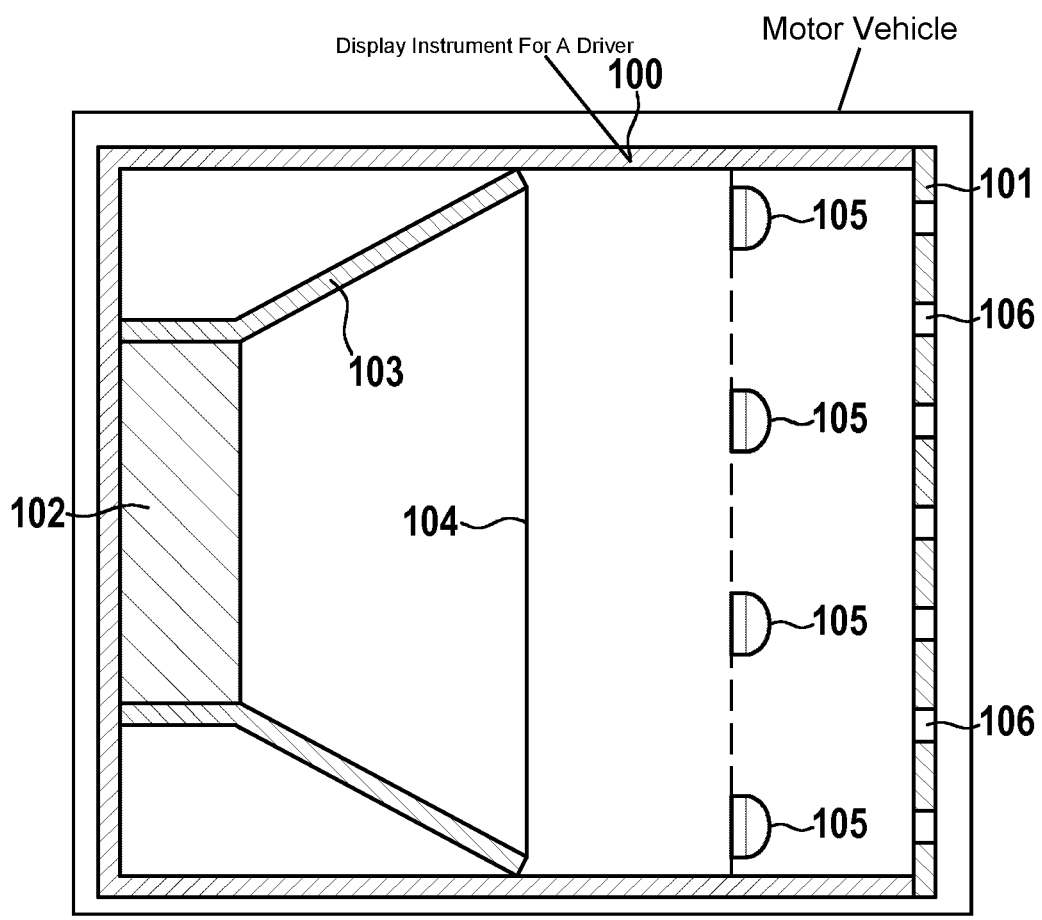

LOUDSPEAKER WITH A LIGHTING ELEMENT CONTAINED THEREIN

BACKGROUND INFORMATION

German Patent Application No. DE 10 2006 050 764 A1 describes a motorcycle comprising a display device. Here, an electronic assembly monitors at least one state parameter, and when a predefined state parameter occurs a signal is generated which controls a display device. At least a part of the display device is integrated into a windshield of the motorcycle or is formed by the windshield.

SUMMARY

The present invention relates to a loudspeaker containing a sound-generating element and a grill mounted as a cover in front of the sound-generating element, the grill having optically transparent areas, at least one lighting element being mounted between the sound-generating element and the grill, the lighting element being visible through the optically transparent areas of the grill from the outside when illuminated. Mounting the lighting elements in the space between the diaphragm and the grill, which is often otherwise unoccupied, makes it possible to arrange the lighting elements in a space-saving manner.

In one advantageous embodiment of the present invention, the grill has a grid-like lattice structure.

In one advantageous embodiment of the present invention, the sound-generating element is a diaphragm.

In one advantageous embodiment of the present invention, the at least one lighting element is a light-emitting diode.

In one advantageous embodiment of the present invention, there is a plurality of lighting elements arranged in a grid-like lattice structure, the lattice spacings of the lattice structure of the lighting elements matching the lattice spacings of the lattice structure of the grill.

One advantageous embodiment of the present invention is used in a motor vehicle as a display instrument for the driver.

In one advantageous embodiment of the present invention, the motor vehicle is a single-track motor vehicle.

BRIEF DESCRIPTION OF THE DRAWING

FIG. 1 shows a side-view schematic design of a loudspeaker in accordance with an example embodiment of the present invention.

DETAILED DESCRIPTION OF EXAMPLE EMBODIMENTS

The present invention relates to the integration of a visual display instrument into a loudspeaker, in particular in a single-track motor vehicle, in particular a motorcycle. Here, the loudspeaker may be a loudspeaker of a radio mounted in or next to the instrument panel or a loudspeaker of another acoustic information-providing device, for example. Common loudspeakers comprise a grid-like cover, also called a grill. The acoustic signal of the loudspeaker penetrates through the openings of the grill to the outside. At the same time, these openings are suitable for allowing optical or visual signals which are generated inside the loudspeaker to penetrate to the outside and thereby provide the driver with visual information in addition to the acoustic information of the loudspeaker. To this end, optical illuminants may be mounted between the diaphragm of the loudspeaker and the grill, for example, the optical illuminants, when in the illuminated state, being visible from the outside through the grill but not seen by the driver in the passive or dark state. These illuminants may also be disposed in a grid-like structure which is mounted inside the loudspeaker in such a way that the individual lighting elements are mounted below the individual openings of the grill, all of the lighting elements thereby being visible in the illuminated state. By controlling individual lighting elements individually, it is thus also possible to reproduce patterns, symbols or numbers and communicate these to the driver. The lighting elements may also be controlled to blink or to produce different colors.

FIG. 1 shows a cross section of a loudspeaker from the side. 100 identifies the housing of the loudspeaker 103, the sound waves of which are radiated outward through the grill 101 in particular. The magnet of the loudspeaker is identified by 102, and 104 identifies the diaphragm which forms a sound-generating surface and which is fastened or clamped at the edges of loudspeaker 103. There is a layer comprising lighting elements 105 disposed between sound-generating diaphragm 104 and grill 101, which comprises the holes 106 through which the sound exits the housing. In the cross section shown, 4 lighting elements 105 are shown, each of which is positioned centered below a sound outlet opening 106. In the non-activated state, these lighting elements are dark and cannot be perceived, or can only barely be perceived, through the grill. In the activated or illuminated state, the optical signals of the lighting elements are visible from the outside through the openings of the grill. This kind of loudspeaker is suitable for example for motorcycles that have a loudspeaker laterally next to the instrument panel element and a grill facing the driver. Thus, the loudspeaker can be used simultaneously to provide the driver with visual information or warnings without having to provide additional space on the instrument panel for a warning lamp.

What is claimed is:

1. A loudspeaker, comprising:
    a sound-generating element;
    a grill mounted as a cover in front of the sound-generating element, the grill having optically transparent areas; and
    at least one lighting element mounted between the sound-generating element and the grill, the lighting element being visible from outside the loudspeaker through the optically transparent areas of the grill, when illuminated, wherein:
    the grill has a first grid-like lattice structure,
    the at least one lighting element includes a plurality of individual lighting elements, the individual lighting elements being arranged in a second grid-like lattice structure, lattice spacings of the second lattice grid-like structure between adjacent individual lighting elements matching corresponding lattice spacings of the first grid-like lattice structure of the grill,
    the loudspeaker is situated in a motor vehicle as a display instrument for a driver of the motor vehicle,
    the first grid-like lattice structure includes a plurality of holes aligned with the light emitting elements,
    light from each one of the light emitting elements is transmitted through a corresponding one of the holes, and
    the plurality of individual lighting elements are individually controllable in order to reproduce symbols or numbers for providing visual information or warnings to the driver.

2. The loudspeaker as recited in claim 1, wherein the sound-generating element is a diaphragm.

3. The loudspeaker as recited in claim 1, wherein the at least one lighting element is a light-emitting diode.

\* \* \* \* \*